(12) United States Patent
Nakamura et al.

(10) Patent No.: US 8,123,303 B2
(45) Date of Patent: Feb. 28, 2012

(54) AUTOMOBILE WHEEL AND PROCESS FOR PRODUCING THE SAME

(75) Inventors: Satoru Nakamura, Anjo (JP); Katsuya Chashiro, Anjo (JP); Atsuhiko Jinno, Anjo (JP)

(73) Assignee: Central Motor Wheel Co., Ltd., Anjo (JP)

( * ) Notice: Subject to any disclaimer, the term of this patent is extended or adjusted under 35 U.S.C. 154(b) by 83 days.

(21) Appl. No.: 12/688,129

(22) Filed: Jan. 15, 2010

(65) Prior Publication Data

US 2010/0181822 A1 Jul. 22, 2010

(30) Foreign Application Priority Data

Jan. 16, 2009 (JP) ................................ 2009-007312

(51) Int. Cl.
*B60B 3/10* (2006.01)
(52) U.S. Cl. .............................. 301/63.105; 301/63.104
(58) Field of Classification Search ............ 301/63.101, 301/63.103, 63.104, 63.105, 63.106, 95.101, 301/95.105, 95.107, 95.108; 29/894.322, 29/894.323
See application file for complete search history.

(56) References Cited

U.S. PATENT DOCUMENTS 2,016,525 A * 10/1935 Temple .......................... 301/6.2
(Continued)

FOREIGN PATENT DOCUMENTS

JP 11-042901 A 2/1999

*Primary Examiner* — Jason Bellinger
(74) *Attorney, Agent, or Firm* — McDermott Will & Emery LLP

(57) ABSTRACT

In an automobile wheel, a surface-side flange is provided on an outer circumferential edge of a wheel disk. The surface-side flange includes: a surface-side annular circumferential portion on an aesthetic surface; and a back-side annular circumferential portion that is formed continuously with, and on the back side of, the surface-side annular circumferential portion and that is thinner than the surface-side annular circumferential portion. An inner circumferential end of the back-side annular circumferential portion of the surface-side flange and an opening end of a surface-side bead seat of a wheel rim are welded together all along their circumferences. The automobile wheel allows the back-side annular circumferential portion of the surface-side flange to bear a stress that acts on a weld area. This relaxes the stress concentration on the weld area.

4 Claims, 9 Drawing Sheets

U.S. PATENT DOCUMENTS

| | | | | |
|---|---|---|---|---|
| 2,057,565 A * | 10/1936 | Eksergian | | 301/5.1 |
| 2,083,326 A * | 6/1937 | Eksergian | | 301/5.1 |
| 2,214,319 A * | 9/1940 | Bourdon | | 301/63.107 |
| 6,052,901 A * | 4/2000 | Stegemann et al. | | 29/894.324 |
| 7,347,505 B2 * | 3/2008 | Rodrigues et al. | | 301/63.103 |
| 2006/0284474 A1 * | 12/2006 | Bluemel | | 301/63.101 |
| 2009/0212620 A1 * | 8/2009 | Coleman et al. | | 301/63.104 |
| 2011/0156474 A1 * | 6/2011 | Chashiro | | 301/63.105 |
| 2011/0198915 A1 * | 8/2011 | Chashiro | | 301/63.103 |

* cited by examiner (A)

(B)

(A)

(B)

(A)

(B)

PRIOR ART

AUTOMOBILE WHEEL AND PROCESS FOR PRODUCING THE SAME

CROSS-REFERENCE TO PRIOR APPLICATIONS

Priority is claimed to Japanese Patent Application No. 2009-007312, filed on Jan. 16, 2009, which is hereby incorporated by reference in its entirety herein.

FIELD OF THE INVENTION

The present invention relates to an automobile wheel that includes: a wheel rim on which a tire is mounted; and a wheel disk to which an axle is connected, in which the wheel rim and the wheel disk are welded together into one piece. Also, the present invention relates to a method of manufacturing the automobile wheel.

BACKGROUND

A conventional automobile wheel is typically of a two-piece construction in which a substantially cylindrical wheel rim and a substantially disk-shaped wheel disk are welded together. A drop-engaged wheel, a bead-engaged wheel, and a full-face wheel are well-known automobile wheels of the two-piece construction. In the drop-engaged wheel, the wheel disk is engaged with and welded to an inner circumferential surface of a drop portion of the wheel rim. In the bead-engaged wheel, the wheel disk is engaged with and welded to an inner circumferential surface of a surface-side bead seat of the wheel rim.

FIG. 9 shows an example of the full-face automobile wheel (m), as described in Japanese Unexamined Patent Publication No. Tokkai-Hei 11-42901. A wheel rim (f) has a surface-side bead seat (g) and a back-side flange (not shown) respectively on one opening edge and the other opening edge of the wheel rim (f). A wheel disk (p) has a surface-side flange (r) on an outer circumferential edge of the wheel disk (p). The surface-side flange (r) is bent to the back side of the wheel disk (p). The surface-side bead seat (g) of the wheel rim (f) has an opening end (h), while the surface-side flange (r) of the wheel disk (p) has an inner circumferential end (v). The opening end (h) and the inner circumferential end (v) are welded together all along their circumferences. This construction of the full-face automobile wheel (m) ensures a larger aesthetic surface of the wheel disk, compared to those drop-engaged and bead-engaged automobile wheels, and therefore has the great advantage of offering great aesthetics.

SUMMARY OF THE INVENTION

Problem to be Solved by the Invention

In the conventional automobile wheel described in the Japanese Unexamined Patent Publication No. Tokkai-Hei 11-42901, the opening end (h) of the surface-side bead seat (g) of the wheel rim (f) and the inner circumferential end (v) of the surface-side flange (r) of the wheel disk (p) are welded together, which is indicated as a weld area (i). The weld area (i) maintains joint strength between the wheel rim (f) and the wheel disk (p). In the weld area (i), in order to keep air in a tire from leaking out, the opening end (h) of the surface-side bead seat (g) and the inner circumferential end (v) of the surface-side flange (r) need be melted sufficiently and welded together along their circumferences.

In this conventional automobile wheel, if a crack (break) has appeared in the weld area (i), the air in the tire leaks out through the crack. Therefore, the strength and durability of the weld area (i) are the most important factors in determining endurance performance of the automobile wheel. This leads to a demand for improved durability of the weld area (i).

The present invention provides an automobile wheel that includes: a wheel disk with a surface-side flange bent to a back side of the wheel disk; and a wheel rim, in which the wheel disk and the wheel rim are welded together with improved weld strength and durability.

Means for Solving the Problem

In a first embodiment, the present invention provides an automobile wheel that includes: a wheel rim that has a back-side flange and a surface-side bead seat respectively on one opening edge and the other opening edge of the wheel rim; and a wheel disk that has a surface-side flange on an outer circumferential edge of the wheel disk, in which the outer circumferential edge of the wheel disk is bent in a curved shape to the back side of the wheel disk so that the surface-side flange of the wheel disk includes: a surface-side annular circumferential portion on an aesthetic surface; and a back-side annular circumferential portion that is formed continuously with, and on the back side of, the surface-side annular circumferential portion, the back-side annular circumferential portion has a thickness smaller than a thickness of the surface-side annular circumferential portion, and an inner circumferential end of the back-side annular circumferential portion of the surface-side flange and an opening end of the surface-side bead seat of the wheel rim are welded together along a circumferential direction.

The conventional automobile wheel (see FIG. 9) disclosed in the Japanese Unexamined Patent Publication No. Tokkai-Hei 11-42901 was subjected to a durability test. In the durability test, a phenomenon was relatively often observed that a break started from the weld area (i) where the wheel rim (f) and the wheel disk (p) were welded together, and strength of the weld area (i) affected endurance performance of the automobile wheel. The present inventors found, as a consequence of devoting themselves to the study of the conventional automobile wheel for the purpose of enhancing the strength of the weld area (i), that in the surface-side flange (r) of the wheel disk (p), a back-side part (u) is thicker than a surface-side part (s), which causes significant stress concentration on the weld area (i), and thus the durability of the weld area (i) reaches its upper limit. To be more specific, the present inventors learned under the close observation of the surface-side flange (r) of the wheel disk (p) that when the surface-side flange (r) is formed by bending, deformational flow is generated on the back-side part (u), which results in the thicker back-side part (u), and therefore, the back-side part (u) has a thickness t4 greater than a thickness t1 of the surface-side part (s). The thicker back-side part (u) of the surface-side flange (r) has enhanced stiffness. When a stress acts on the surface-side flange (r), the stress tends not to be distributed to the thicker back-side part (u), but to concentrate on the weld area (i). Especially, the wheel disk (p) is normally thicker than the wheel rim (f) (t1>t3). This results in a more remarkable tendency of the increased stress concentration on the weld area (i). It is conceivable that such stress concentration on the weld area causes the strength and durability of the weld area to reach their upper limits.

In an embodiment, the present invention is designed for the back-side annular circumferential portion of the surface-side flange to be thinner than the surface-side annular circumferential portion so that the back-side annular circumferential portion has lower stiffness. Therefore, when a stress acts on the surface-side flange, the stress is born by the back-side annular circumferential portion that is then elastically deformed under the stress. The stress that acts on the weld area is easily distributed to the back-side annular circumferential portion. This relaxes the stress concentration on the weld area. Thus, a higher stress is required for the weld area to reach its upper limit durability. This means improvement in overall endurance performance of the automobile wheel.

Normally, the wheel disk is thicker than the wheel rim. In accordance with the first embodiment of the invention, there is a small difference in thickness between the back-side annular circumferential portion of the surface-side flange and the surface-side bead seat. It is assumed that there is a large difference in thickness between the back-side annular circumferential portion and the surface-side bead seat that are welded together. The larger thickness difference causes more uneven heat conduction to the back-side annular circumferential portion and to the surface-side bead seat during the welding step and causes more uneven cooling of the back-side annular circumferential portion and of the surface-side bead seat after the welding step. Accordingly, welding distortion is more easily generated. In contrast, in accordance with the first embodiment of the invention, the back-side annular circumferential portion has a reduced thickness to have a small difference in thickness from the surface-side bead seat, as described above. This enhances the effect of minimizing the welding distortion, and therefore enhances the strength and durability of the weld area.

In addition, in accordance with the first embodiment of the invention, the back-side annular circumferential portion of the surface-side flange is thinner than the surface-side annular circumferential portion. The automobile wheel according to the first embodiment of the invention has the advantage of lighter weight than the conventional automobile wheel (see FIG. 9).

In the first embodiment of the invention, preferably the back-side annular circumferential portion of the surface-side flange of the wheel disk may have a thickness that is at least equal to or greater than a thickness of the surface-side bead seat. Because if the back-side annular circumferential portion is thinner than the surface-side bead seat, the back-side annular circumferential portion can have further lower strength and stiffness. This creates a concern about a decrease in durability of the back-side annular circumferential portion.

In the aforementioned automobile wheel, the back-side annular circumferential portion of the surface-side flange of the wheel disk is formed of a thickness equal to a thickness of the surface-side bead seat of the wheel rim.

The above construction reduces a difference in stiffness between the back-side annular circumferential portion and the surface-side bead seat as much as possible. Thus, when a stress acts on the weld area, the stress is efficiently distributed to the back-side annular circumferential portion and the surface-side bead seat. This further enhances the functional effect of relaxing the stress concentration on the weld area. Therefore, the above construction further enhances the functional effect of the invention of improving the endurance performance of the automobile wheel. In addition, the above construction minimizes uneven heat conduction to the back-side annular circumferential portion and to the surface-side bead seat during the welding step and minimizes uneven cooling of the back-side annular circumferential portion and of the surface-side bead seat after the welding step. Accordingly, the above construction further enhances the effect of minimizing welding distortion.

In the aforementioned automobile wheel, the inner circumferential end of the back-side annular circumferential portion of the surface-side flange of the wheel disk is formed with a groove that is recessed toward the surface side direction, and the opening end of the surface-side bead seat of the wheel rim is butt-welded to the inner circumferential end.

In the above construction, the inner circumferential end of the back-side annular circumferential portion of the surface-side flange is formed with the groove. When the inner circumferential end and the opening end of the surface-side bead seat of the wheel rim are welded together, weld heat is easily conducted to the inner circumferential end and the opening end. Thus, in this weld area, molten weld metal flows sufficiently into the inner circumferential end and into the opening end. Therefore, the strength of the weld area improves, and accordingly the durability of the weld area improves. This allows for further improvement in overall endurance performance of the automobile wheel of the invention.

A second embodiment of the present invention is directed to a method of manufacturing an automobile wheel of the invention, the method including: a surface-side flange forming step of forming a surface-side flange that includes: a surface-side annular circumferential portion on an aesthetic surface and a back-side annular circumferential portion that is thinner than the surface-side annular circumferential portion, in which the surface-side flange forming step includes: a bending step of bending an outer circumferential end of a wheel disk in a curved shape to the back side of the wheel disk; and a thickness reducing step of reducing a thickness of the outer circumferential end, and the bending step and the thickness reducing step are performed in sequence.

In accordance with the second embodiment of the invention, the surface-side flange of the invention is appropriately and stably formed with the back-side annular circumferential portion that is thinner than the surface-side annular circumferential portion. Thus, an automobile wheel that is manufactured by the method of manufacturing an automobile wheel according to the second embodiment of the invention appropriately exhibits the above functional effect of the invention.

In the method of manufacturing an automobile wheel according to the second embodiment of the invention, the thickness reducing step is performed following the bending step of bending the circumferential end in a curved shape to the back side of the wheel disk. Thus, in the thickness reducing step, cutting may be employed preferably to reduce a thickness of the outer circumferential end.

A third embodiment of the present invention is directed to a method of manufacturing an automobile wheel of the invention, the method including: a surface-side flange forming step of forming a surface-side flange that includes: a surface-side annular circumferential portion on an aesthetic surface and a back-side annular circumferential portion that is thinner than the surface-side annular circumferential portion, in which the surface-side flange forming step includes: a first bending step of bending an outer circumferential end of a wheel disk in parallel to a central axis of the wheel disk; a thickness reducing step of reducing a thickness of the outer circumferential end; and a second bending step of bending the outer circumferential end toward an inward direction, and the first bending step, the thickness reducing step, and the second bending step are performed in sequence.

In accordance with the third embodiment of the invention, the outer circumferential end of the wheel disk is bent in two stages, and the thickness reducing step is performed between the two stages. This allows the thickness of the back-side annular circumferential portion of the surface-side flange to be easily controlled, while minimizing wrinkles and other defects. Therefore, the surface-side flange is appropriately and stably formed with the back-side annular circumferential portion of a desired reduced thickness. Thus, an automobile wheel that is manufactured by the method of manufacturing an automobile wheel according to the third embodiment of the invention appropriately exhibits the above functional effect of the invention.

In the method of manufacturing an automobile wheel according to the third embodiment of the invention, iron-pressing or spin flow forming may be employed preferably in the thickness reducing step. Using these machining techniques, this method of manufacturing an automobile wheel has the great advantage of reducing manufacturing costs compared to the manufacturing method using the cutting.

A fourth embodiment of the present invention is directed to a method of manufacturing an automobile wheel of the invention, the method including: a surface-side flange forming step of forming a surface-side flange that includes: a surface-side annular circumferential portion on an aesthetic surface and a back-side annular circumferential portion that is thinner than the surface-side annular circumferential portion, in which the surface-side flange forming step includes: a thickness reducing step of reducing a thickness of an outer circumferential end of a wheel disk; and a bending step of bending the outer circumferential end in a curved shape to the back side of the wheel disk; and the thickness reducing step and the bending step are performed in sequence.

In accordance with the fourth embodiment of the invention, the thinner outer circumferential end is bent. This provides the excellent effect of minimizing wrinkles and other defects on bending the outer circumferential end. Thus, the surface-side flange is appropriately and stably formed with the thinner annular circumferential portion of a desired shape. Thus, an automobile wheel that is manufactured by the method of manufacturing an automobile wheel according to the fourth embodiment of the invention appropriately exhibits the above functional effect of the invention.

In the method of manufacturing an automobile wheel according to the fourth embodiment of the invention, pressing may be employed preferably in the thickness reducing step. In addition, the thickness reducing step may be performed on an outer circumferential end of a substantially circular flat plate before the flat plate is formed into the wheel disk, or the thickness reducing step may be performed on the outer circumferential end of the wheel disk after the flat plate is formed into the wheel disk. In either case, pressing is employed. Thus, this method of manufacturing an automobile wheel has the great advantage of reducing manufacturing costs compared to the manufacturing method using cutting.

In the method of manufacturing an automobile wheel according to one of the second to fourth embodiments of the invention, the surface-side flange forming step further includes a groove cutting step of cutting the inner circumferential end of the back-side annular circumferential portion of the surface-side flange to form a groove that is recessed toward the surface side direction, and the groove cutting step is performed following the thickness reducing step.

In the above method of manufacturing an automobile wheel, the inner circumferential end of the back-side annular circumferential portion of the surface-side flange is stably formed with the groove. Then, in a welding step of butt-welding the opening end of the surface-side bead seat of the wheel rim to the inner circumferential end, the inner circumferential end and the opening end are heated so sufficiently that molten weld metal flows sufficiently into the inner circumferential end and into the opening end. This allows stably forming the weld area, where the opening end and the inner circumferential end are welded together, which exhibits sufficient strength and durability.

In the groove cutting step, cutting, pressing and other machining techniques may be employed preferably.

Effect of the Invention

As described above, the present invention provides an automobile wheel in which the surface-side flange of the wheel disk includes: the surface-side annular circumferential portion on the aesthetic surface; and the back-side annular circumferential portion that is formed continuously with, and on the back side of, the surface-side annular circumferential portion and that is thinner than the surface-side annular circumferential portion, and the inner circumferential end of the back-side annular circumferential portion of the surface-side flange and the opening end of the surface-side bead seat of the wheel rim are welded together along the circumferential direction. Thus, the thinner back-side annular circumferential portion has lower stiffness. This allows the stress that acts on the weld area to be easily distributed to the back-side annular circumferential portion, and relaxes the stress concentration on the weld area. In addition, there is a small difference in thickness between the back-side annular circumferential portion and the opening end of the surface-side bead seat. This reduces the welding distortion that is caused by welding, and therefore enhances the strength of the weld area. This leads to improvement in durability of the weld area, and accordingly leads to improvement in overall endurance performance of the automobile wheel.

In the aforementioned automobile wheel of the invention, the back-side annular circumferential portion of the surface-side flange of the wheel disk is formed of a thickness equal to a thickness of the surface-side bead seat of the wheel rim. This construction allows the stress that acts on the weld area to be efficiently distributed to the back-side annular circumferential portion and to the surface-side bead seat, and thus further enhances the functional effect of relaxing the stress concentration on the weld area. Therefore, the endurance performance of the automobile wheel further improves. In addition, the above construction minimizes uneven heat conduction to the back-side annular circumferential portion and to the surface-side bead seat during the welding step and minimizes uneven cooling of the back-side annular circumferential portion and of the surface-side bead seat after the welding step. Accordingly, the above construction further enhances the effect of minimizing welding distortion.

In the above automobile wheel, the inner circumferential end of the back-side annular circumferential portion of the surface-side flange of the wheel disk is formed with the groove that is recessed toward the surface side direction, and the opening end of the surface-side bead seat of the wheel rim is butt-welded to the inner circumferential end. Thus, in this weld area, molten weld metal flows sufficiently into the inner circumferential end of the back-side annular circumferential portion and into the opening end of the surface-side bead seat. This enhances the strength and durability of the weld area, and accordingly further improves the overall endurance performance of the automobile wheel.

In turn, the present invention provides a method of manufacturing an automobile wheel of the invention. The method includes: a surface-side flange forming step that includes: a bending step of bending an outer circumferential end of a wheel disk in a curved shape to the back side of the wheel disk; and a thickness reducing step of reducing a thickness of the outer circumferential end, and in which the bending step and the thickness reducing step are performed in sequence. This allows the surface-side flange of the invention to be appropriately and stably formed with the back-side annular circumferential portion of a thickness smaller than a thickness of the surface-side annular circumferential portion. Thus, an automobile wheel that is manufactured by the method of manufacturing an automobile wheel of the invention appropriately exhibits the above functional effect of the invention.

Also, the present invention provides a method of manufacturing an automobile wheel of the invention. The method includes: a surface-side flange forming step that includes: a first bending step of bending an outer circumferential end of a wheel disk in parallel to a central axis of the wheel disk; a thickness reducing step of reducing a thickness of the outer circumferential end; and a second bending step of bending the outer circumferential end toward an inward direction, and in which the first bending step, the thickness reducing step, and the second bending step are performed in sequence. This allows the thickness of the back-side annular circumferential portion of the surface-side flange to be easily controlled, while minimizing wrinkles and other defects. The surface-side flange of the invention is thereby formed appropriately and stably. Thus, an automobile wheel that is manufactured by the method of manufacturing an automobile wheel of the invention appropriately exhibits the above functional effect of the invention.

Further, the present invention provides a method of manufacturing an automobile wheel of the invention. The method includes: a surface-side flange forming step that includes: a thickness reducing step of reducing a thickness of an outer circumferential end of a wheel disk; and a bending step of bending the outer circumferential end in a curved shape to the back side of the wheel disk, and in which the thickness reducing step and the bending step are performed in sequence. This allows wrinkles and other defects to be minimized in the bending step. The surface-side flange of the invention is thereby formed appropriately and stably. Thus, an automobile wheel that is manufactured by the method of manufacturing an automobile wheel of the invention appropriately exhibits the above functional effect of the invention.

In the aforementioned methods of manufacturing an automobile wheel of the invention, the surface-side flange forming step further includes: a groove cutting step of cutting the inner circumferential end of the back-side annular circumferential portion of the surface-side flange to form a groove that is recessed toward the surface side direction, and the groove cutting step is performed following the thickness reducing step. This allows the inner circumferential end to be stably formed with the groove, while allowing molten weld metal to flow sufficiently into the inner circumferential end and the opening end of the surface-side bead seat in the welding step. The automobile wheel is thereby obtained which has the improved strength and durability in the weld area.

BEST MODE FOR CARRYING OUT THE INVENTION

Detailed Description

First Embodiment

With reference to the accompanying drawings, an automobile wheel 1 according to a first embodiment of the invention will be described in detail below.

Figure 1:
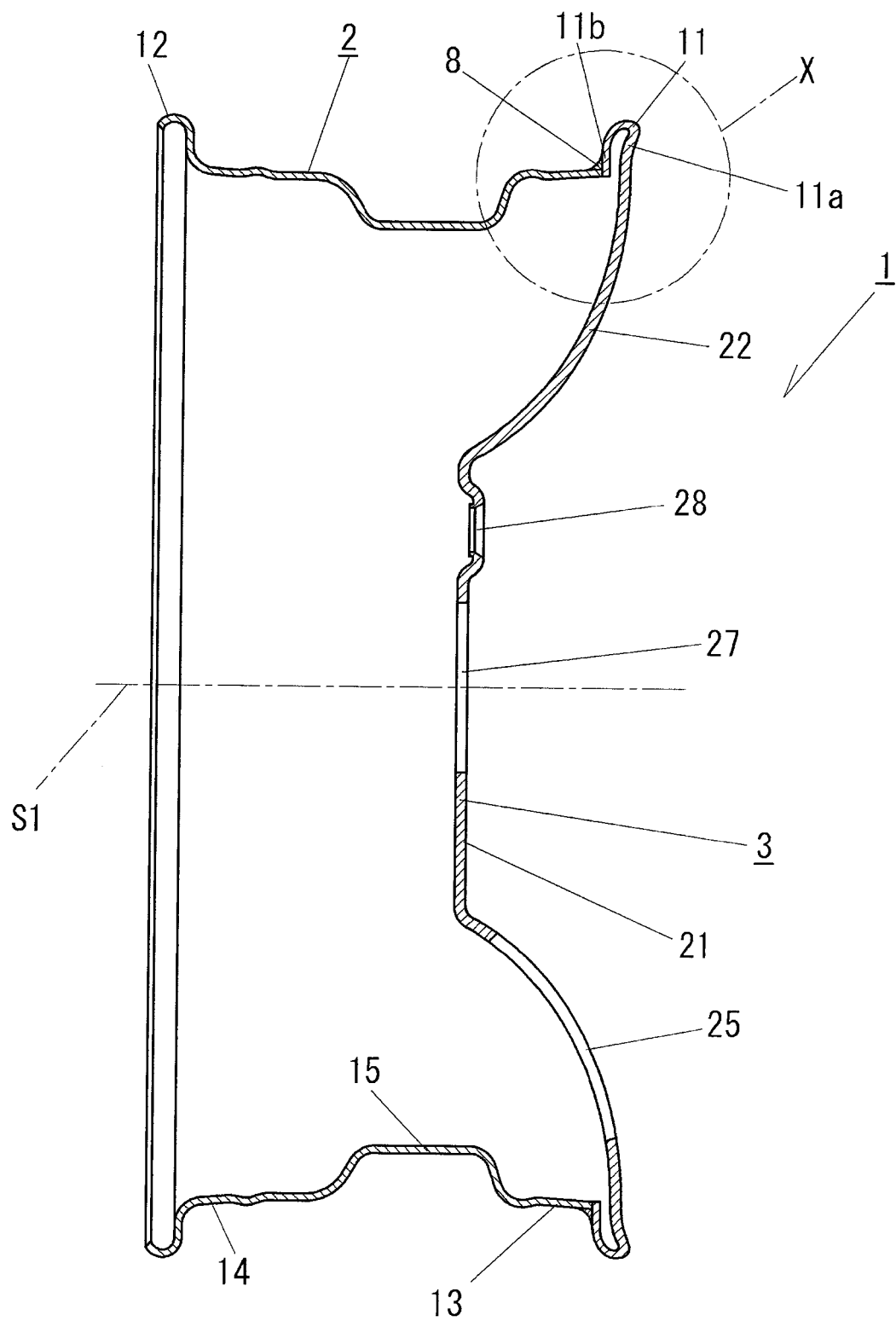
FIG. 1 is a vertical cross-sectional view of an automobile wheel 1 according to a first embodiment to a third embodiment of the present invention.

FIG. 1 is a vertical cross-sectional view of the automobile wheel 1 of the first embodiment 1. The automobile wheel 1 is made of steel and is of a two-piece construction that includes a wheel rim 2 and a wheel disk 3. The wheel rim 2 and the wheel disk 3 are individually formed from a flat steel sheet and joined together. The wheel disk 3 has a surface-side flange 11 on an outer circumferential edge 340 (see FIG. 2) of the wheel disk 3. It should be noted that in the first embodiment of the invention, a direction toward an aesthetic surface side of the wheel disk 3 from its back side is designated as a surface side direction, while a direction opposite to the surface side direction is designated as a back side direction. Also, it should be noted that one radial direction of the automobile wheel 1 toward a central axis S1 of the automobile wheel 1 is designated as a radially inward direction, while the other radial direction opposite to the radially inward direction is designated as a radially outward direction.

The wheel rim 2 is substantially cylindrical, and has a back-side flange 12 on one opening edge (on the back side) of the wheel rim 2. The back-side flange 12 is designed to laterally support a bead on the back side of a tire. The back-side flange 12 is continuously formed with a back-side bead seat 14. The back-side bead seat 14 is designed to allow the bead on the back side of the tire to be seated, thus to fixedly support the bead. The wheel rim 2 also has a surface-side bead seat 13 on the other opening edge (on the surface side) of the wheel rim 2. The surface-side bead seat 13 is designed to allow a bead on the surface side of the tire to be seated, thus to fixedly support the bead. Between the surface-side bead seat 13 and the back-side bead seat 14, a drop portion 15 is provided. The drop portion 15 is designed to drop the beads on the surface side and the back side of the tire into the drop portion 15 on mounting the tire.

The wheel disk 3 is substantially disc-shaped, and has a hub mounting portion 21 at the center of the wheel disk 3. The hub mounting portion 21 connects with an axle hub. The wheel disk 3 has the surface-side flange 11 on the outer circumferential edge 340 (see FIG. 2) of the wheel disk 3.

Between the hub mounting portion 21 and the surface-side flange 11, a plurality of radially-extending spokes 22 are provided at equal intervals in the circumferential direction such that the hub mounting portion 21 and the surface-side flange 11 are continuously formed with each other. Between the two adjacent spokes 22, a decorative hole 25 is defined.

A hub hole 27 is formed at the center of the hub mounting portion 21. A plurality of bolt holes 28 are provided at positions radially outward from the hub hole 27 at equal intervals in the circumferential direction. The individual parts of the wheel disk 3 are formed concentrically. The spokes 22 rise obliquely from a circumference of the hub mounting portion 21 toward the surface side. The side-surface flange 11 is continuously formed with radially outward ends of the spokes 22 in a smooth manner.

The surface-side flange 11 is bent in a curved shape to the back side of the wheel disk 3, and includes a surface-side annular circumferential portion 11a on the aesthetic surface and a back-side annular circumferential portion 11b. The surface-side annular circumferential portion 11a is continuously formed with the radially outward ends of the spokes 22. The back-side annular circumferential portion 11b is formed continuously with, and on the back side of, the surface-side annular circumferential portion 11a, and extends toward the radially inward direction. The back-side annular circumferential portion 11b has an inner diameter that is substantially equal to an inner diameter of an opening end 13a of the surface-side bead seat 13 of the wheel rim 2. The surface-side flange 11 has a thickness t1 at the surface-side annular circumferential portion 11a and a thickness t2 that is smaller than the thickness t1 at the back-side annular circumferential portion 11b (see FIG. 2), which will be discussed in detail later.

The wheel rim 2 and the wheel disk 3 are welded together, thereby obtaining the automobile wheel 1 of the first embodiment of the invention. To be more specific, the opening end 13a of the surface-side bead seat 13 of the wheel rim 2 and an inner circumferential end 11c of the back-side annular circumferential portion 11b of the surface-side flange 11 of the wheel disk 3 are welded together (see FIG. 2), thereby forming the wheel rim 2 and the wheel disk 3 into one piece.

Now, a method of manufacturing the automobile wheel 1 according to the first embodiment of the invention will be described below.

The wheel rim 2 may be formed from a substantially rectangular flat steel plate (e.g. 2.0 mm to 4.5 mm in thickness) by a conventional rolling method.

In the conventional rolling method, the flat steel plate is first rolled in a cylinder form with shorter sides of the plate being butt-welded together. Then, while this cylinder is rotated, specific inner and outer molds press the cylinder therebetween from the inside and the outside of the cylinder. Further details on the process of forming the wheel rim 2 are not described here.

In turn, the wheel disk 3 is formed from a substantially circular flat steel sheet (e.g. 3.7 mm to 8.5 mm in thickness) into a desired shape of the aesthetic surface by press-drawing several times. More specifically, the wheel disk 3 of the desired shape is obtained by an aesthetic area forming step and a subsequent surface-side flange forming step. In the aesthetic area forming step, the aesthetic surface of the wheel disk 3 is formed with recesses and protrusions and then drilled to form the decorative holes 25, and circumferences of the decorative holes 25 are subjected to finishing. In the surface-side flange forming step, the surface-side flange 11 is formed.

Alternatively, the wheel disk 3 of the desired shape may be obtained by first performing the surface-side flange forming step of forming the surface-side flange 11, and by subsequently performing the aesthetic area forming step. Further alternatively, the wheel disk 3 of the desired shape may be obtained by simultaneously performing the surface-side flange forming step of forming the surface-side flange 11 and the aesthetic area forming step. Other than the surface-side flange forming step, the conventional forming steps may be employed in the method of manufacturing the automobile wheel 1 according to the first embodiment of the invention, and therefore, they are not described any further.

The wheel rim 2 is formed from a flat steel sheet that is thinner than a flat steel sheet used for the wheel disk 3.

The surface-side flange forming step of forming the surface-side flange 11 will be described below.

According to the first embodiment of the invention, an intermediately-formed body 33 of the wheel disk 3 is formed by the aesthetic area forming step. An outer circumferential end 34 of the intermediately-formed body 33 is formed into the surface-side flange 11 by a first bending step (see FIG. 3A and FIG. 3B), a thickness reducing step (see FIG. 4A and FIG. 4B), and a second bending step (see FIG. 5A and FIG. 5B). In the first bending step shown in FIG. 3A and FIG. 3B, the annular outer circumferential end 34 of the intermediately-formed body 33 is first bent toward the back side direction in parallel to a central axis S2 (a central axis of the wheel disk 3). Then, in the thickness reducing step shown in FIG. 4A and FIG. 4B, the bent outer circumferential end 34' is subjected to iron-pressing to reduce its thickness. Subsequently, in the second bending step shown in FIG. 5A and FIG. 5B, the outer circumferential end 34" of the reduced thickness is bent toward the radially inward direction. The surface-side flange 11 is thereby formed. Therefore, in the method of manufacturing the automobile wheel 1 according to the first embodiment of the invention, the surface-side flange forming step includes: the first bending step (see FIG. 3A and FIG. 3B); the thickness reducing step (see FIG. 4A and FIG. 4B); and the second bending step (see FIG. 5A and FIG. 5B).

Figure 3:
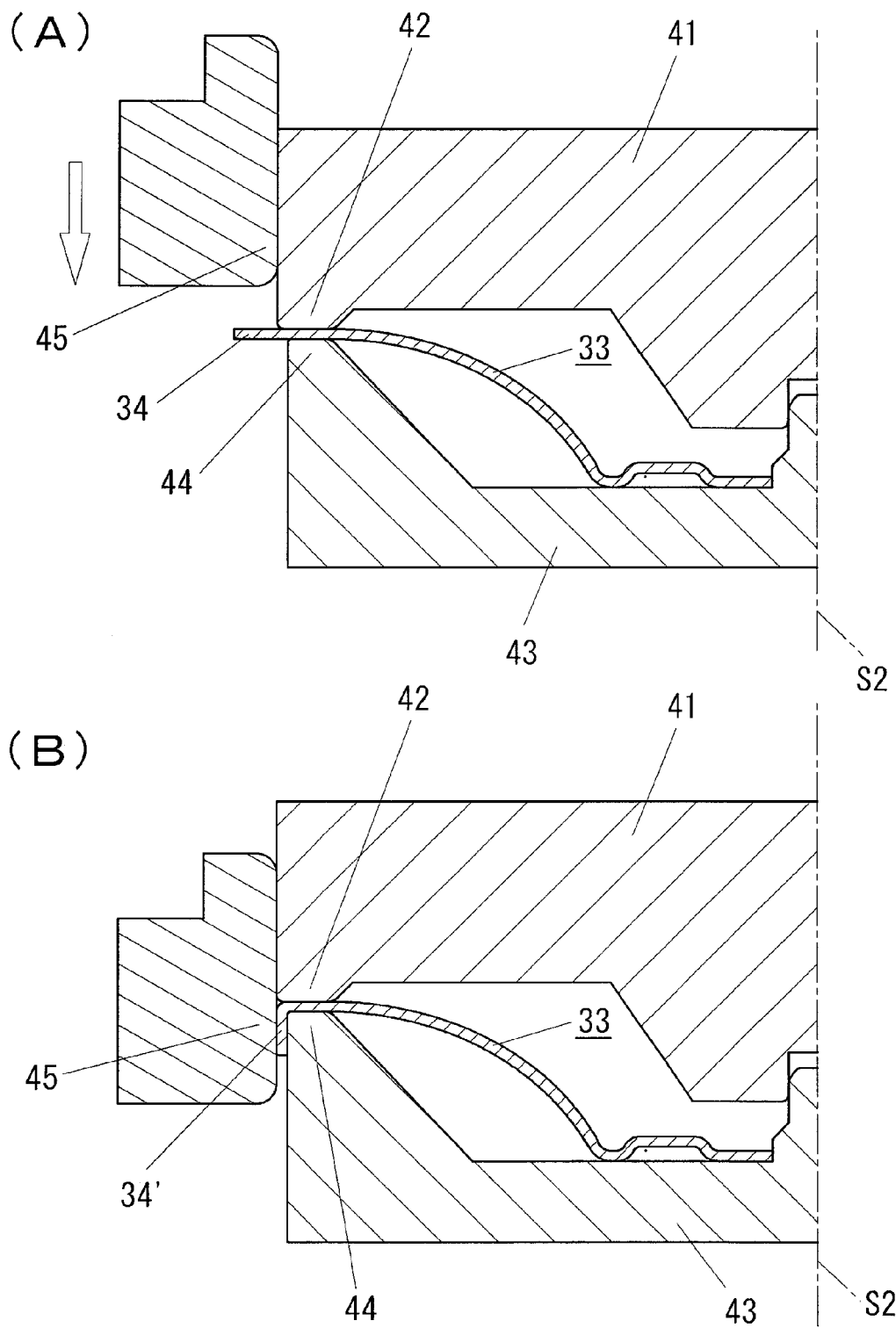
FIG. 3A and FIG. 3B are explanatory views of a first bending step that is included in a surface-side flange forming step according to the first embodiment of the invention.

To be more specific, as shown in FIG. 3A, in the first bending step following the aesthetic area forming step, the outer circumferential edge of the intermediately-formed body 33 is sandwiched between an upper support mold 41 and a lower support mold 43 along the circumferential direction. The upper support mold 41 is provided with an annular support protrusion 42 that protrudes downward from the upper support mold 41. The lower support mold 43 is provided with an annular support protrusion 44 that protrudes upward from the lower support mold 43. The intermediately-formed body 33 is first set in place and then sandwiched between the upper support mold 41 and the lower support mold 43. Subsequently, as shown in FIG. 3B, the annular outer circumferential end 34 that protrudes outward from the upper support mold 41 and the lower support mold 43 is bent by a ring punch 45 in parallel to the central axis S2. The first bending step is performed in the aforementioned manner, so that the outer circumferential end 34' extends in parallel to the central axis S2.

Figure 4:
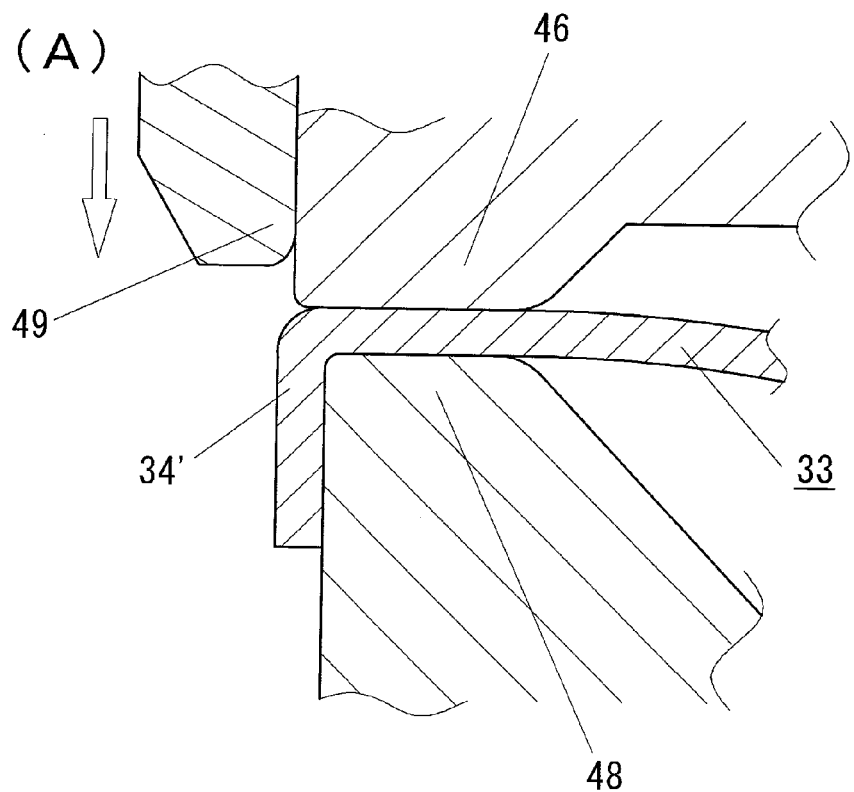
FIG. 4A and FIG. 4B are explanatory views of a thickness reducing step that is included in the surface-side flange forming step according to the first embodiment of the invention.
Figure 4:
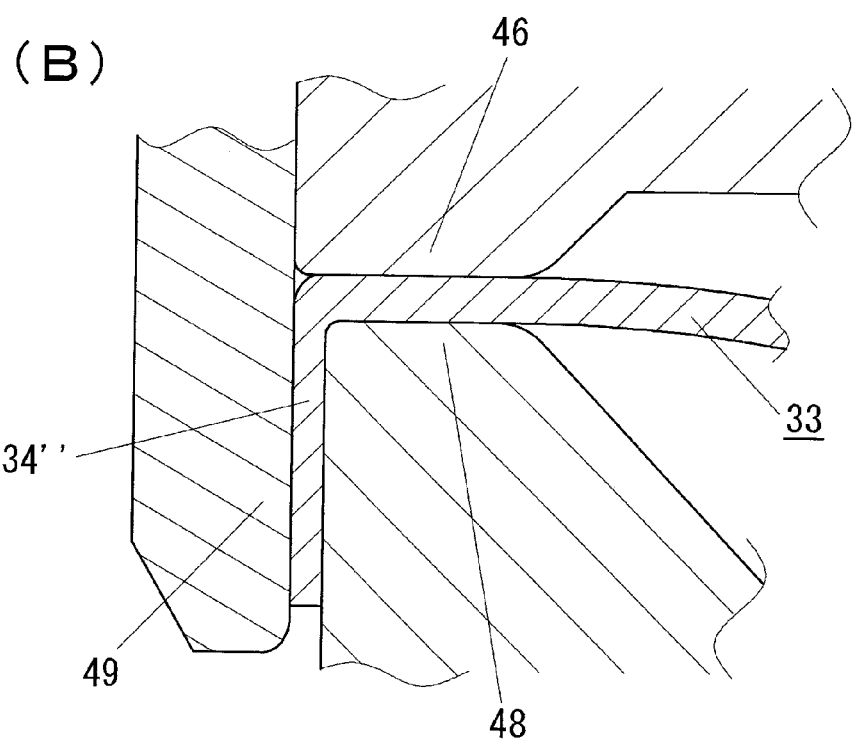

Following the first bending step, the thickness reducing step is performed. As shown in FIG. 4A, an upper support mold 46 and a lower support mold 48 support the intermediately-formed body 33 along the circumferential direction on an immediately inner side of the bent outer circumferential end 34'. Then, as shown in FIG. 4(B), a ring punch 49 moves downward along an outer circumferential surface of the upper support mold 46, and the outer circumferential end 34' is thereby subjected to ironing to reduce its thickness. The reduced thickness of the outer circumferential end 34" is predetermined by an outer circumferential diameter of the lower support mold 48 and an inner circumferential diameter of the ring punch 49.

Figure 2:
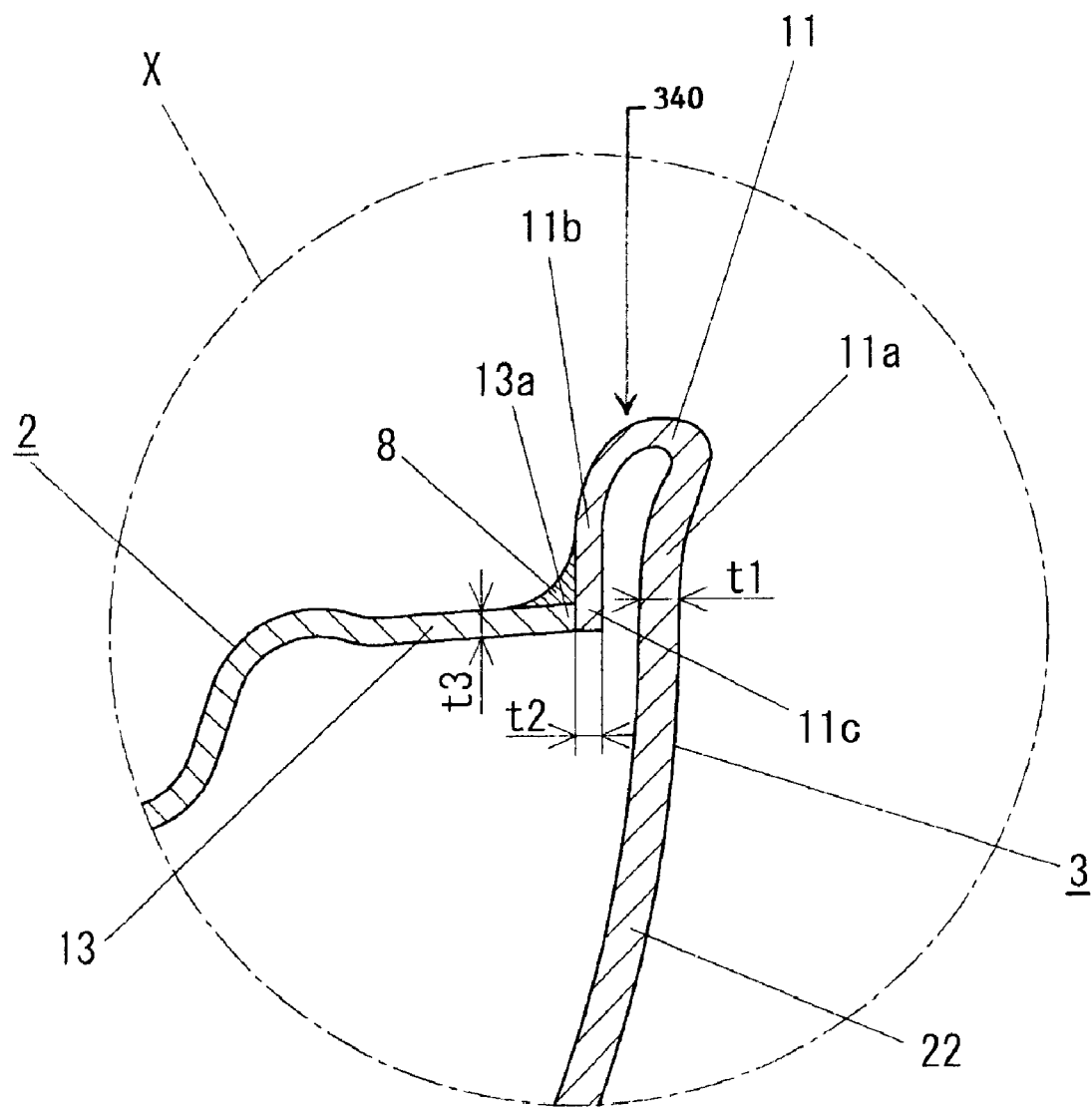
FIG. 2 is an enlarged view of a part of the automobile wheel 1, which is indicated by X in FIG. 1.
Figure 5:
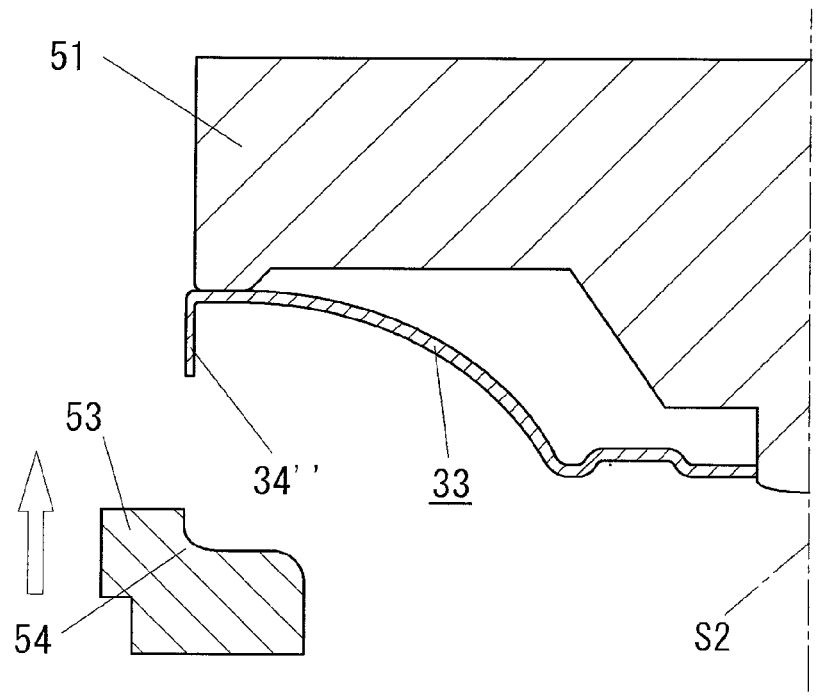
FIG. 5A and FIG. 5B are explanatory views of a second bending step that is included in the surface-side flange forming step according to the first embodiment of the invention.
Figure 5:
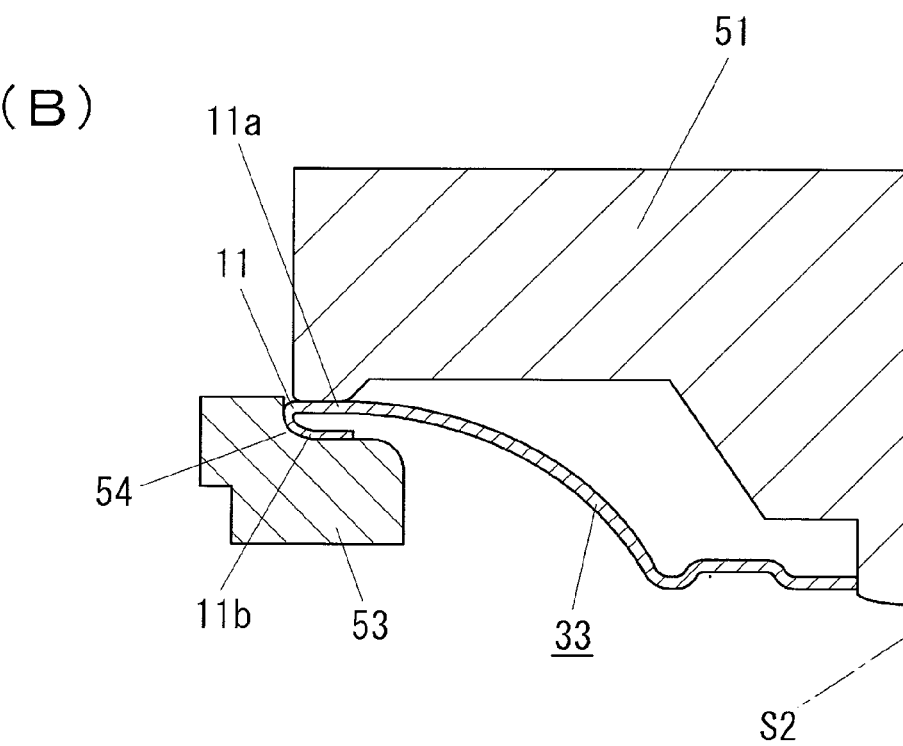

Following the thickness reducing step, the second bending step is performed. As shown in FIG. 5A, an upper support mold 51 supports the outer circumferential edge of the intermediately-formed body 33 from above, and a ring bending mold 53 moves upward in parallel to the central axis S2 of the intermediately-formed body 33. The ring bending mold 53 is provided with a bending circumferential portion 54. As shown in FIG. 5B, the bending circumferential portion 54 of the ring bending mold 53 is used to bend the outer circumferential end 34" of the reduced thickness toward the radially inward direction. The surface-side flange 11 is thereby formed. As shown in FIG. 2, the surface-side flange 11 includes: the surface-side annular circumferential portion 11a on the aesthetic surface; and the back-side annular circumferential portion 11b. The back-side annular circumferential portion 11b is bent in a curved shape to the back side and extends toward the radially inward direction. The back-side annular circumferential portion 11b has the thickness t2 smaller than the thickness t1 of the surface-side annular circumferential portion 11a. In the second bending step, the outer circumferential end 34" is bent toward the radially inward direction, and is thus formed into the back-side annular circumferential portion 11b. A part of the back-side annular circumferential portion 11b on its distal end side (the inner circumferential end 11c side) is oriented perpendicular to the central axis S2.

In the automobile wheel 1 of the first embodiment of the invention, the surface-side flange 11 of the wheel disk 3 is formed by the aforementioned surface-side flange forming step, such that the back-side annular circumferential portion 11b of the wheel disk 3 has the thickness t2 that is substantially equal to a thickness t3 of the surface-side bead seat 13 of the wheel rim 2.

In the surface-side flange forming step according to the first embodiment of the invention, the outer circumferential end 34 is bent in a curved shape to the back side in two stages, that is, in the first bending step and in the second bending step. This minimizes winkles and other defects. In addition, between the first bending step and the second bending step, the outer circumferential end 34' is subjected to ironing by the ring punch to reduce the thickness of the outer circumferential end 34'. A desired thickness is thus easily obtained. Therefore, this surface-side flange forming step has the advantage of easily controlling the thickness of the back-side annular circumferential portion 11b of the surface-side flange 11. The thickness reducing step is performed by ironing, and therefore, has the advantage of being highly effective in reducing the forming costs. Furthermore, according to the first embodiment of the invention, the three steps, that are the first bending step, the second bending step, and the thickness reducing step (ironing), may be performed in combination with the aesthetic area forming step. In other words, the wheel disk 3 that has the surface-side annular circumferential portion 11a and the back-side annular circumferential portion 11b is formed solely by pressing. No additional facilities are needed other than a pressing machine. This allows for low-cost forming of the wheel disk 3.

These wheel rim 2 and wheel disk 3 are welded together into one piece in a welding step (not shown) to obtain the automobile wheel 1 of the first embodiment of the invention. In the welding step, the inner circumferential end 11c of the back-side annular circumferential portion 11b of the surface-side flange 11 of the wheel disk 3 abuts against the opening end 13a of the surface-side bead seat 13 of the wheel rim 2 (FIG. 2), with the central axis S2 (see FIG. 3A, FIG. 3B, FIG. 5A and FIG. 5B) of the wheel disk 3 corresponding with a central axis (not shown) of the wheel rim 2. Then, the inner circumferential end 11c and the opening end 13a are arc-welded together from outside all along their circumferences. As described above, the back-side annular circumferential portion 11b and the surface-side bead seat 13 have a substantially equal thickness. This easily allows welding heat to be conducted approximately evenly to both the back-side annular circumferential portion 11b and the surface-side bead seat 13. Thus, in the weld area 8 all along its circumference, molten weld metal flows evenly and sufficiently into both the back-side annular circumferential portion 11b and the surface-side bead seat 13. As described above, the back-side annular circumferential portion 11b and the surface-side bead seat 13 have a substantially equal thickness. This minimizes uneven heat conduction to the back-side annular circumferential portion 11b and to the surface-side bead seat 13 during the welding step and minimizes uneven cooling of the back-side annular circumferential portion 11b and of the surface-side bead seat 13 after the welding step. Accordingly, welding distortion is further minimized. This allows the weld area 8 to have improved strength and durability.

In the automobile wheel 1, the back-side annular circumferential portion 11b of the surface-side flange 11 of the wheel disk 3 has the reduced thickness (see FIG. 2). Thus, when a stress acts on the weld area 8, the stress is born by the back-side annular circumferential portion 11b that is then elastically deformed under the stress. This relaxes the stress concentration on the weld area 8. Especially, the back-side annular circumferential portion 11b and the surface-side bead seat 13 of the wheel rim 2 have a substantially equal thickness. This provides the excellent functional effect of efficiently distributing the stress to both the back-side annular circumferential portion 11b and the surface-side bead seat 13. Thus, the stress concentration on the weld area 8 is more effectively relaxed.

Therefore, the automobile wheel of the first embodiment of the invention has improved strength and durability in the weld area 8, and thus exhibits excellent endurance performance.

Figure 9:
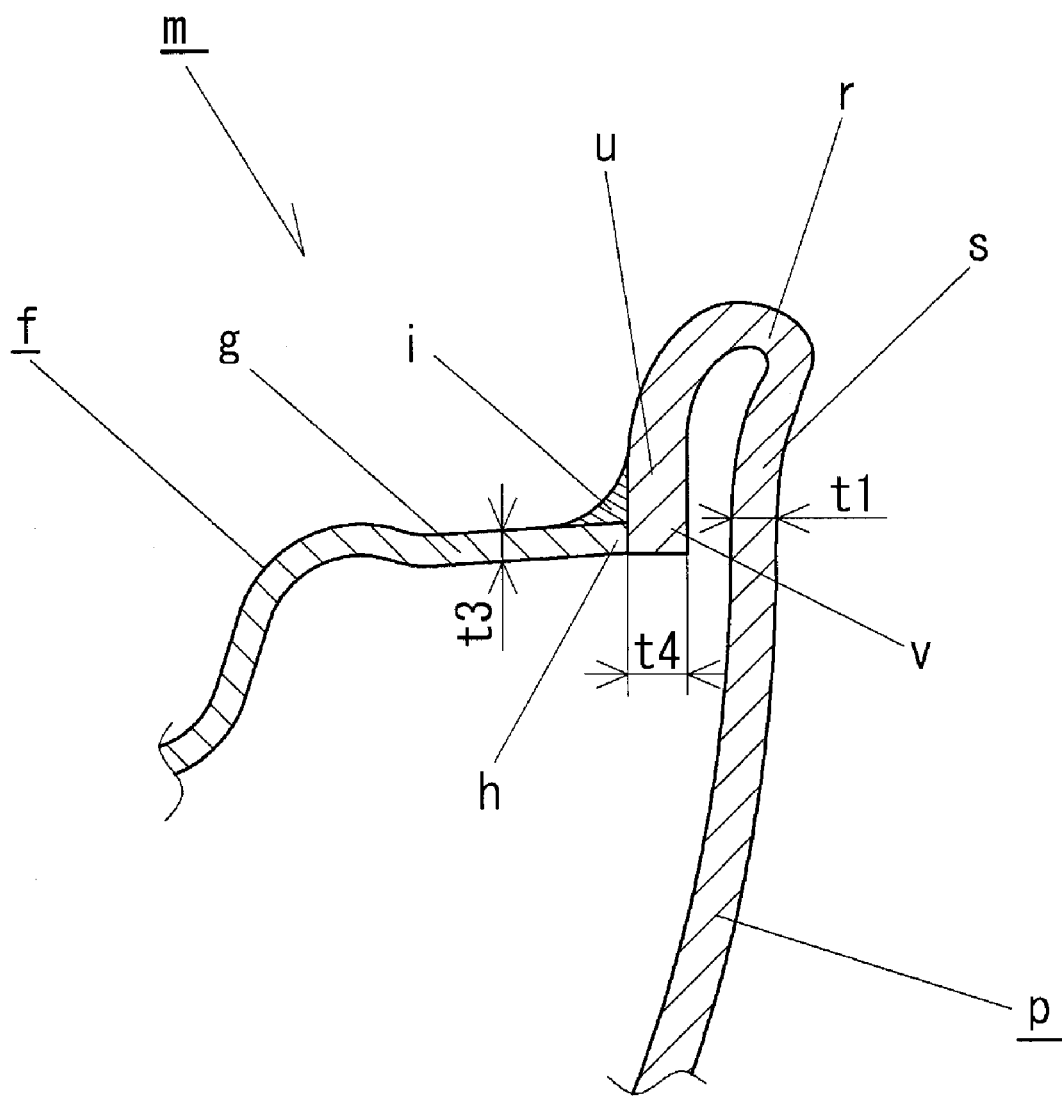
FIG. 9 is a partially enlarged vertical cross-sectional view of a conventional automobile wheel (m), showing a surface-side bead seat (r) of a wheel disk (p).

In the aforementioned conventional automobile wheel (m) (see FIG. 9), it is assumed that the wheel disk (p) is formed from a flat steel sheet of thickness equal to the thickness of the flat steel sheet used for the wheel disk 3 of the automobile wheel 1 of the first embodiment, while the wheel rim (f) is formed from a flat steel sheet of thickness equal to the thickness of the flat steel sheet used for the wheel rim 2 of the automobile wheel 1. The back-side annular circumferential portion 11b of the surface-side flange 11 of the wheel disk 3 is thinner than a back-side part (u) of the surface-side flange (r) of the conventional wheel disk (p). Thus, the automobile wheel 1 of the first embodiment has another advantage of lighter weight than the conventional automobile wheel (m) in the assumed case.

Second Embodiment

According to the second embodiment of the invention, in the process of forming the wheel disk 3, a substantially circular flat steel sheet 31 is subjected to the thickness reducing step (see FIG. 6A and FIG. 6B) in which an outer circumferential end 32 of the flat steel plate 31 is pressed to reduce its thickness. In short, the thickness reducing step is performed prior to the aesthetic area forming step. Then, the bending process is performed simultaneously with or after the aesthetic area forming step. In the bending process, the outer circumferential end 32' of the intermediately-formed body is bent to the back side. The surface-side flange 11 is thereby formed.

In a method of manufacturing an automobile wheel according to the second embodiment of the invention, an automobile wheel that has the same construction of the automobile wheel 1 of the first embodiment is manufactured. Therefore, the construction of the automobile wheel 1 is not described repeatedly (see FIG. 1 and FIG. 2).

Figure 6:
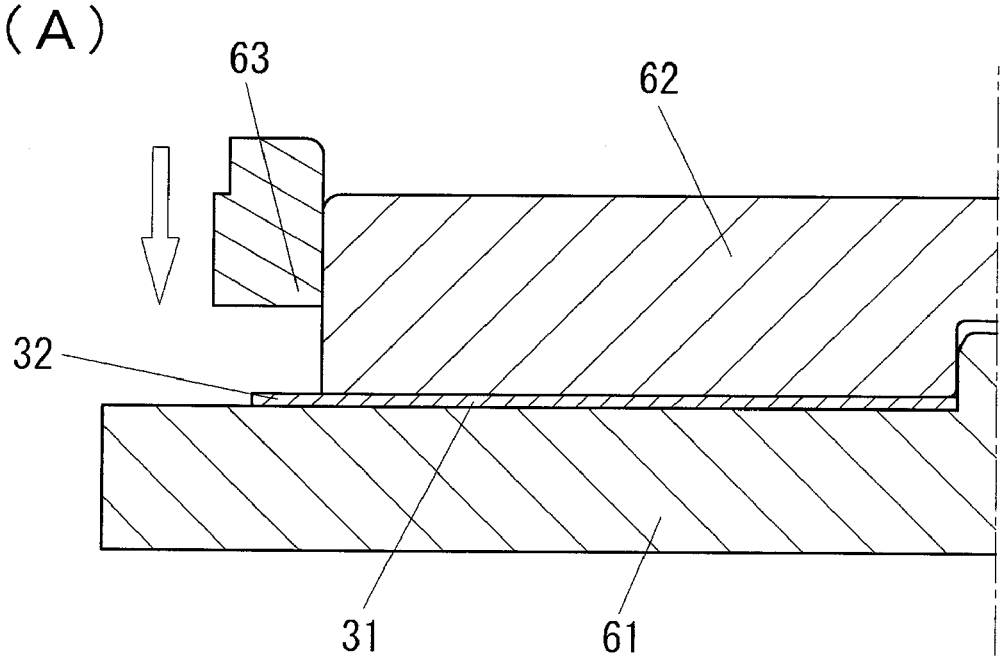
FIG. 6A and FIG. 6B are explanatory views of the thickness reducing step that is included in the surface-side flange forming step according to the second embodiment of the invention.
Figure 6:
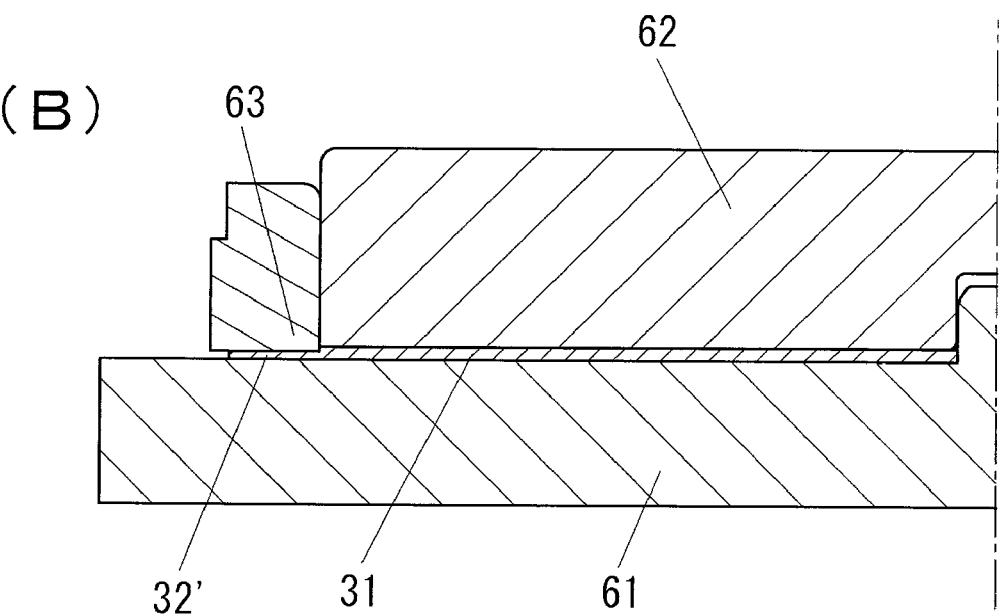

In the process of forming the wheel disk 3, in the thickness reducing step shown in FIG. 6A, the substantially circular flat steel plate 31 to be formed into the wheel disk 3 is entirely supported on the underside by a lower support mold 61, while being supported on the surface side by a cylindrical upper support mold 62. The upper support mold 62 has an outer diameter that is predetermined smaller than an outer diameter of the flat steel plate 31. As shown in FIG. 6(B), a ring punch 63 moves from the surface side along an outer circumference of the upper support mold 62 to press the outer circumferential end 32 of the flat steel sheet 31 to reduce the thickness of the outer circumferential end 32. The flat steel sheet 31 is thereby formed with the outer circumferential end 32' of the reduced thickness.

Subsequently, the flat steel sheet 31 is formed into a desired shape on the aesthetic surface by the aesthetic area forming step, as in the case of the first embodiment. In the aesthetic area forming step, the outer circumferential end 32' is not directly machined, but its shape is maintained. According to the second embodiment of the invention, the flat steel sheet 31 is subjected to the thickness reducing step and the aesthetic area forming step such that the outer circumferential end 32' has a recess on the aesthetic surface.

The intermediately-formed body is formed in the aesthetic area forming step, and then is subjected to the first bending step (see FIG. 3A and FIG. 3B) and the second bending step (see FIG. 5A and FIG. 5B) in sequence as in the case of the first embodiment 1. Consequently, the outer circumferential end 32" of the intermediately-formed body is bent in a curved shape to the back side. The surface-side flange 11 is thereby formed which includes: the back-side annular circumferential portion 11b or the bent outer circumferential portion 32'; and the surface-side annular circumferential portion 11a on the aesthetic surface. In the method of manufacturing an automobile wheel according to the second embodiment of the invention, as shown in FIG. 2, the surface-side flange 11 includes: the surface-side annular circumferential portion 11a; and the back-side annular circumferential portion 11b, as in the case of the first embodiment of the invention. Also, the back-side annular circumferential portion 11b has the thickness t2 that is substantially equal to the thickness t3 of the surface-side bead seat 13 of the wheel rim 2.

According to the second embodiment of the invention, the flat steel plate 31 is subjected to the thickness reducing step. This allows the thickness of the outer circumferential end 32 of the flat steel plate 31 to be easily reduced in a stable and precise manner, and thus allows the thickness to be easily controlled. In addition, according to the second embodiment of the invention, the bending step is performed in two stages: the first bending step and the second bending step. This achieves the effect of minimizing winkles and other defects, as in the case of the first embodiment.

As described above, the wheel disk 3 is formed first, and then is welded to the wheel rim 2, thus to obtain the automobile wheel 1 of the invention. According to the second embodiment of the invention, the automobile wheel 1 with excellent endurance performance is also obtained, as in the case of the first embodiment.

In addition, according to the second embodiment of the invention, the automobile wheel 1 also has the advantage of lighter weight than the conventional automobile wheel (m) (see FIG. 9), as in the case of the first embodiment.

In the method of manufacturing an automobile wheel according to the second embodiment of the invention, the surface-side flange forming step includes: the thickness reducing step and the bending step. The thickness reducing step is designed to reduce the thickness of the outer circumferential end 32 of the flat steel plate 31. The bending step includes the first bending step and the second bending step. The steps other than the surface-side flange forming step are the same as the steps performed in the first embodiment of the invention. Thus, the details of the same steps are not described repeatedly.

Third Embodiment

According to the third embodiment of the invention, in the process of forming the wheel disk 3, the aesthetic area forming step, the bending step, and the thickness reducing step are performed in sequence. In a method of manufacturing an automobile wheel according to the third embodiment of the invention, an automobile wheel that has the same construction of the automobile wheel 1 of the first embodiment is manufactured. Therefore, the details of the automobile wheel 1 are not described repeatedly.

In the process of forming the wheel disk 3, the circular flat steel sheet 31 is subjected to the aesthetic area forming step to form an intermediately-formed body. An outer circumferential end of the intermediately-formed body is bent in a curved shape to the back side in the first bending step (see FIG. 3A and FIG. 3B) and the second bending step (see FIG. 5A) and FIG. 5B), as in the case of the first embodiment. Due to the bending, deformational flow is generated on the outer circumferential end. Thus, the bent outer circumferential end is thicker than before the first bending step. Following the second bending step, the outer circumferential end is subjected to the thickness reducing step (not shown) in which the outer circumferential end is cut on its back side to reduce its thickness. As shown in FIG. 2, the back-side annular circumferential portion 11b has the thickness t2 that is substantially equal to the thickness t3 of the surface-side bead seat 13 of the wheel rim 2. The surface-side flange 11 is thereby formed which includes the back-side annular circumferential portion 11b and the surface-side annular circumferential portion 11a.

Thus, according to the third embodiment of the invention, the outer circumferential end of the intermediately-formed body is first bent to the back side, and then is cut to reduce the thickness of the outer circumferential end. Thus, possible winkles and other defects that appear on the bent outer circumferential end are removed by cutting, so that the back side surface of the bent outer circumferential end is smoothed. In addition, following the first and second bending steps in which the outer circumferential end is bent to the back side, the thickness reducing step is performed by cutting. This assures stable, high-precision forming of the back-side annular circumferential portion 11b. According to the third embodiment of the invention, the bending step is performed in two stages: the first bending step and the second bending step. This achieves the effect of minimizing winkles and other defects.

As described above, the wheel disk 3 is formed first, and then is welded to the wheel rim 2, thus to obtain the automobile wheel 1 of the invention. According to the third embodiment of the invention, the automobile wheel 1 with excellent endurance performance is also obtained, as in the case of the first embodiment. In addition, the automobile wheel 1 also has the advantage of lighter weight than the conventional automobile wheel (m) (see FIG. 9), as in the case of the first embodiment.

In the method of manufacturing an automobile wheel according to the third embodiment of the invention, the surface-side flange forming step includes: the aesthetic area forming step; the bending step that includes the first bending step and the second bending step; and the thickness reducing step. The aesthetic area forming step, the bending step and the thickness reducing step are performed in sequence. The steps other than the surface-side flange forming step are the same as the steps performed in the first embodiment of the invention. Thus, the details of the same steps are not described repeatedly.

Fourth Embodiment

Figure 7:
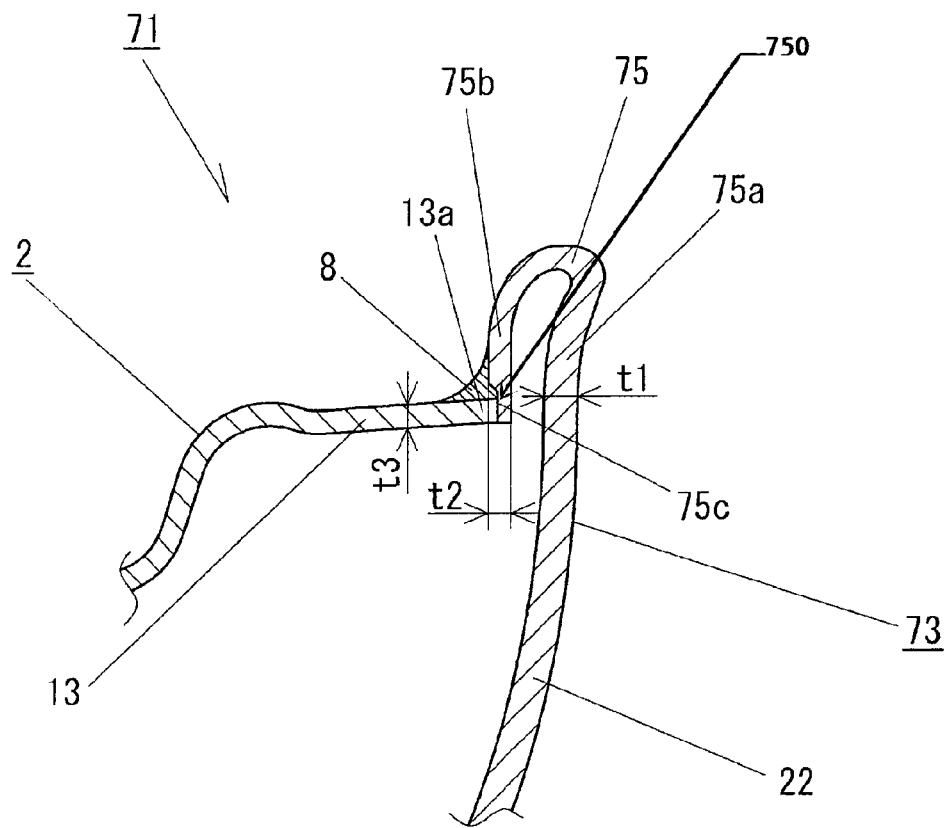
FIG. 7 is a partially enlarged vertical cross-sectional view of an automobile wheel 71 according to a fourth embodiment of the invention, showing a surface-side bead seat 75 of a wheel disk 73.

FIG. 7 shows an automobile wheel 71 according to the fourth embodiment of the invention. The automobile wheel 71 of the fourth embodiment has a wheel disk 73 that includes a surface-side flange 75. The surface-side flange 75 includes an inner circumferential end 75c with a groove 750. As in the case of the first embodiment of the invention, the surface-side flange 75 includes: a surface-side annular circumferential portion 75a and a back-side annular circumferential portion 75b. The inner circumferential end 75c of the back-side annular circumferential portion 75b is recessed from the back side direction toward the surface side direction to reduce the thickness or to define the groove 750. A predetermined width of the groove 750 of the inner circumferential end 75c in the radial direction is greater than the thickness t3 of the surface-side bead seat 13 of the wheel rim 2.

In the process of forming the wheel disk 73, the aesthetic area forming step, the first bending step (see FIG. 3A and FIG. 3B), the thickness reducing step (see FIG. 4A and FIG. 4B), and the second bending step (see FIG. 5A and FIG. 5B) are performed as in the case of the first embodiment of the invention. Subsequently, a groove cutting step (not shown) is performed in which the inner circumferential end 75c is cut to form the groove 750. The surface-side flange 75 of the fourth embodiment of the invention is thereby formed. In other words, according to the fourth embodiment of the invention, the surface-side flange forming step includes the first bending step, the thickness reducing step, the second bending step, and the groove cutting step.

In the process of forming the wheel disk 73, the aesthetic area forming step, the first bending step (see FIG. 3A and FIG. 3B), the thickness reducing step (see FIG. 4A and FIG. 4B), and the second bending step (see FIG. 5A and FIG. 5B) are performed as in the case of the first embodiment of the invention. Subsequently, a groove cutting step (not shown) is performed in which the inner circumferential end 75c is cut to form the groove. The surface-side flange 75 of the fourth embodiment of the invention is thereby formed. In other words, according to the fourth embodiment of the invention, the surface-side flange forming step includes the first bending step, the thickness reducing step, the second bending step, and the groove cutting step.

Then, the wheel disk 73 and the wheel rim 2 are welded together in the welding step. In the welding step, the inner circumferential end 75c of the surface-side flange 75 of the wheel disk 73 abuts against the opening end 13a of the surface-side bead seat 13 of the wheel rim 2 with the central axes of the wheel disk 73 and the wheel rim 2 corresponding with each other. Under this condition, the inner circumferential end 75c of the surface-side flange 75 and the opening end 13a of the surface-side bead seat 13 are welded together from outside all along their circumferences. This allows stably forming the weld area 8 where molten weld metal flows easily and sufficiently into both the inner circumferential end 75c and the opening end 13a.

The automobile wheel 71 manufactured according to the fourth embodiment of the invention has further improved strength and durability in the thus-formed weld area 8, and therefore exhibits extremely high overall endurance performance. In the automobile wheel 71 of the fourth embodiment of the invention shown in FIG. 7, the back-side annular circumferential portion 75b of the surface-side flange 75 also has the thickness t2 that is substantially equal to the thickness t3 of the surface-side bead seat 13. Thus, the automobile wheel 71 achieves the functional effect of relaxing the stress concentration on the weld area 8, and therefore further enhances the effect of improving the endurance performance.

The automobile wheel 71 of the fourth embodiment of the invention has the same construction as the automobile wheel 1 of the first embodiment, except that the surface-side flange 75 of the wheel disk 73 includes the inner circumferential end 75c with the groove 750. Therefore, the construction of the automobile wheel 71 is not described any further. A method of manufacturing the automobile wheel 71 is also the same as the method of manufacturing the automobile wheel 1 according to the first embodiment, except that the groove cutting step is performed. Therefore, the method of the manufacturing the automobile wheel 71 is not described any further.

Figure 8:
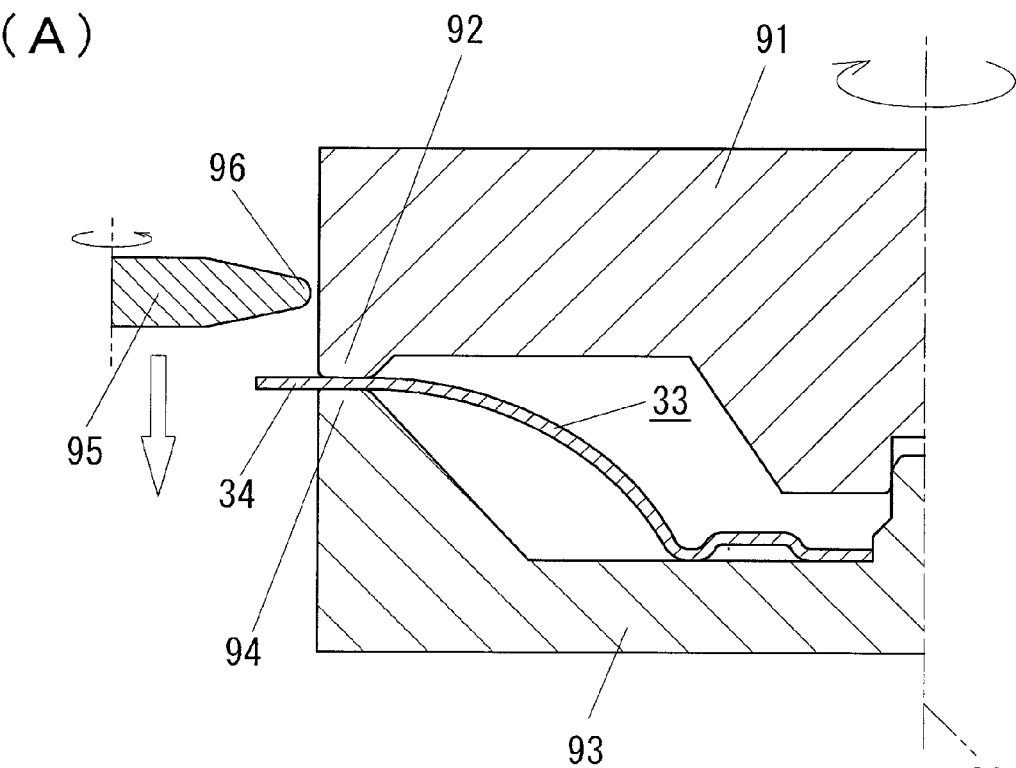
FIG. 8A and FIG. 8B are explanatory views of a flow forming step that is included in the surface-side flange forming step according to a modification of the first embodiment of the invention.
Figure 8:
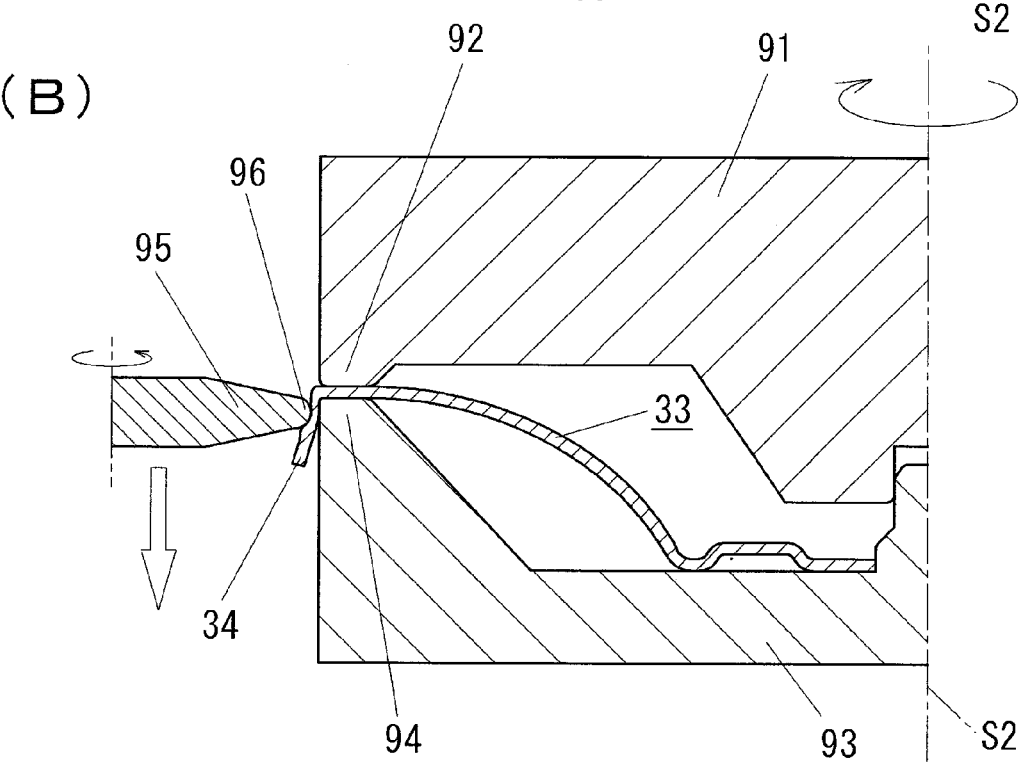

In the method of manufacturing the automobile wheel 1 according to the first embodiment of the invention, the surface-side flange forming step includes the first bending step, the second bending step, and the thickness reducing step. The thickness reducing step is performed between the first bending step and the second bending step by ironing using the ring punch. Alternatively, the surface-side flange forming step includes a flow forming step in place of the first bending step and the thickness reducing step. For example, as shown in FIG. 8A, in the flow forming step following the aesthetic area forming step, the outer circumferential edge of the intermediately-formed body 33 is sandwiched between an upper support mold 91 and a lower support mold 93 along the circumferential direction. The upper support mold 91 is provided with an annular support protrusion 92 that protrudes downward from the upper support mold 91. The lower support mold 93 is provided with an annular support protrusion 94 that protrudes upward from the lower support mold 93. A disk-shaped drawing roller 95 is provided with a spinning circumferential portion 96 on an outer circumferential end of the drawing roller 95. When the upper support mold 91 and the lower support mold 93 rotate about the central axis S2, the drawing roller 95 also rotates while moving downward in parallel to the central axis S2. Subsequently, as shown in FIG. 8B, the annular outer circumferential end 34 that protrudes outward from the upper support mold 91 and the lower support mold 93 is bent and simultaneously subjected to drawing along the outer circumferential surface of the lower support mold 93 by the spinning circumferential portion 96 of the drawing roller 95 to reduce the thickness of the annular outer circumferential end 34. In such case, this reduced thickness of the outer circumferential end 34 is predetermined by a clearance between the outer circumferential surface of the lower support mold 93 and the spinning circumferential portion 96 of the drawing roller 95. Thus, following the flow forming step, the second bending step is performed as in the case of the first embodiment of the invention. Consequently, the same wheel disk is obtained as in the case of the first embodiment, such that the back-side annular circumferential portion of the surface-side flange has a reduced thickness. In this method of manufacturing an automobile wheel, the surface-flange forming process includes the flow forming step and the second bending step. This method of manufacturing an automobile wheel also results in the automobile wheel that achieves the same functional effect as in the first embodiment of the invention.

Alternatively, in the second and third embodiments of the invention, the groove cutting step that is designed to form a groove may also be performed following the second bending step, as in the case of the fourth embodiment. Similarly, the groove cutting step may also be performed when the thickness reducing step is performed as a part of the flow forming step.

In the method of manufacturing an automobile wheel according to the second embodiment of the invention, the circular flat steel plate is subjected to the thickness reducing step. Alternatively, following the aesthetic area forming step, the thickness reducing step may be performed, and then the bending step may follow.

According to the first to fourth embodiments of the invention, the back-side annular circumferential portion of the surface-side flange of the wheel disk has a thickness that is substantially equal to a thickness of the surface-side bead seat of the wheel rim. Alternatively, the back-side annular circumferential portion may have a thickness smaller than a thickness of the surface-side annular circumferential portion and greater than a thickness of the surface-side bead seat. Such construction also allows the stress to be distributed to the back-side annular circumferential portion. This relaxes the stress concentration on the weld area.

According to the first to third embodiments of the invention, the opening end of the surface-side bead seat of the wheel rim is butt-welded to the inner circumferential end of the surface-side flange of the wheel disk. Alternatively, the opening end of the surface-side bead seat of the wheel rim may be engaged with and welded to an inner circumferential surface of the inner circumferential end of the surface-side flange of the wheel disk. In this case, the inner circumferential end of the surface-side flange of the wheel disk has an inner diameter that is substantially equal to an outer diameter of the opening end of the surface-side bead seat of the wheel rim.

It should be apparent that the present invention is not limited to the aforementioned embodiments, and a variety of changes and modifications may be made to the constructions described in those embodiments within the scope of the invention. For example, an automobile wheel may be formed of aluminum alloy or magnesium alloy and have one of the constructions described in the embodiments of the invention. This automobile wheel also achieves the same functional effect as that achieved by the automobile wheel of the aforementioned embodiments of the invention.

DESCRIPTION OF REFERENCE NUMERALS 1, 71: automobile wheel
2: wheel rim
3, 73: wheel disk
11, 75: surface-side flange
11a, 75a: surface-side annular circumferential portion
11b, 75b: back-side annular circumferential portion
11c, 75c: inner circumferential end
12: back-side flange
13: surface-side bead seat
13a: opening end of surface-side bead seat 13
32, 32', 34, 34', 34": outer circumferential end
t1: thickness of surface-side annular circumferential portion
t2: thickness of back-side annular circumferential portion
t3: thickness of surface-side bead seat
S2: central axis of wheel disk

The invention claimed is:

1. An automobile wheel, comprising:
a wheel rim having a substantially cylindrical shape and two opening edges;
a back-side flange disposed on one opening edge of the wheel rim;
a surface-side bead seat disposed on another opening edge of the wheel rim; and
a wheel disk that has a surface-side flange formed from an outer circumferential edge of the wheel disk, wherein
the outer circumferential edge of the wheel disk is bent in a curved shape to the back side of the wheel disk so that the surface-side flange of the wheel disk includes:
a surface-side annular circumferential portion on an aesthetic surface; and
a back-side annular circumferential portion formed continuously with, and on the back side of, the surface-side annular circumferential portion, and the back-side annular circumferential portion has a thickness smaller than a thickness of the surface-side annular circumferential portion, and
wherein an inner circumferential end of the back-side annular circumferential portion of the surface-side flange and an opening end of the surface-side bead seat are welded together along a circumferential direction.

2. The automobile wheel according to claim 1, wherein the back-side annular circumferential portion of the surface-side flange of the wheel disk is formed of a thickness equal to a thickness of the surface-side bead seat of the wheel rim.

3. The automobile wheel according to claim 1, wherein the inner circumferential end of the back-side annular circumferential portion of the surface-side flange of the wheel disk is formed with a groove that is recessed toward a surface side direction, and the opening end of the surface-side bead seat of the wheel rim is butt-welded to the inner circumferential end.

4. The automobile wheel according to claim 2, wherein the inner circumferential end of the back-side annular circumferential portion of the surface-side flange of the wheel disk is formed with a groove that is recessed toward a surface side direction, and the opening end of the surface-side bead seat of the wheel rim is butt-welded to the inner circumferential end.

* * * * *